Aug. 31, 1937.     A. W. WESSMAN     2,091,462
ADJUSTING MEANS FOR THRESHER FEEDER CARRIERS
Filed April 4, 1935
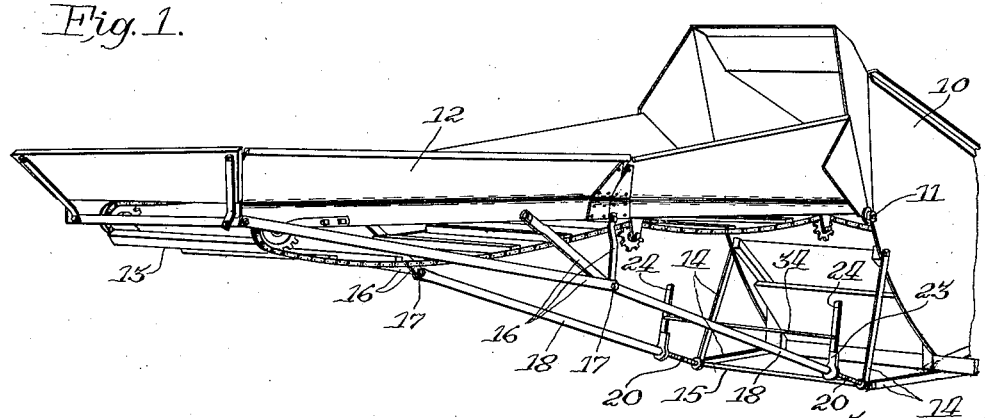
Fig. 1.
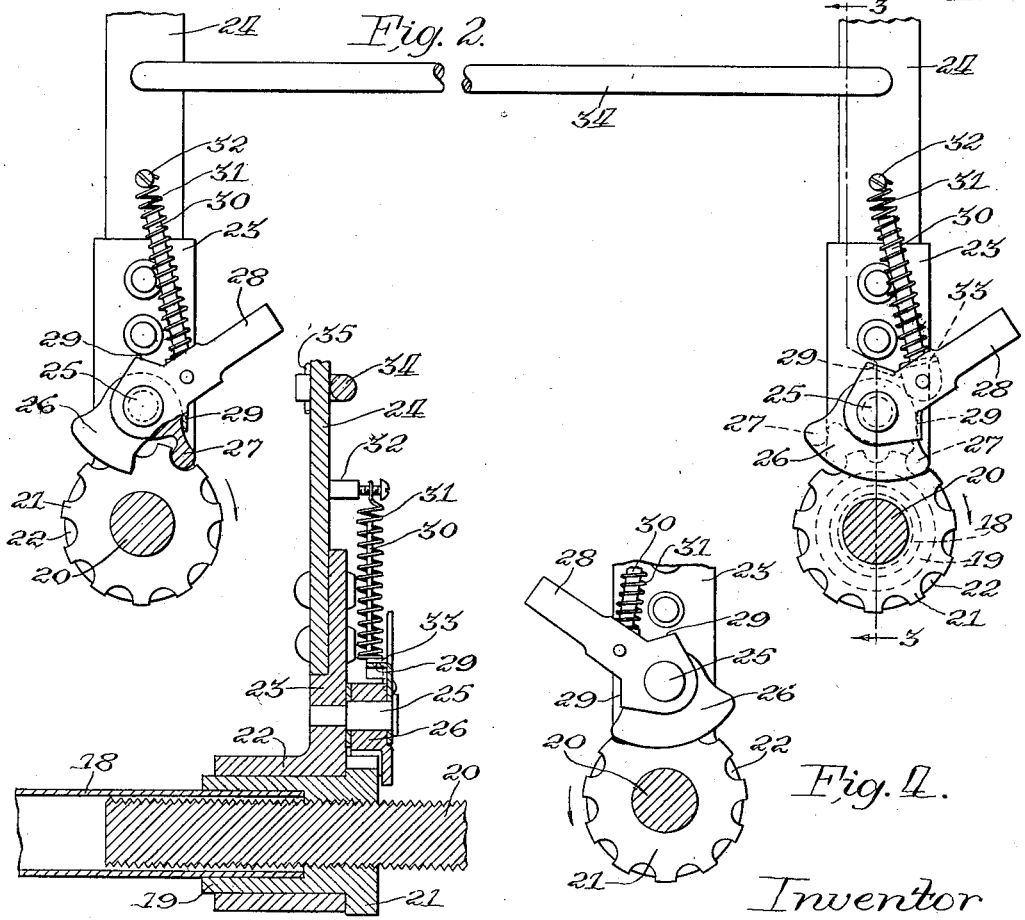
Fig. 2.
Fig. 3.
Fig. 4.
Inventor
Arndt W. Wessman
By /s/ Larogue
Atty.

// Patented Aug. 31, 1937

2,091,462

UNITED STATES PATENT OFFICE 2,091,462

ADJUSTING MEANS FOR THRESHER FEEDER CARRIERS

Arnt W. Wessman, Moline, Ill., assignor to International Harvester Company, a corporation of New Jersey Application April 4, 1935, Serial No. 14,616

2 Claims. (Cl. 198—123)

The invention relates to an improved means for adjusting feeder carriers used in connection with self-feeders for threshing machines.

In using such carriers in practice, they must be adjusted up or down to the desired position for convenient loading. Accordingly, an adjustment has been provided, which, in a standard form, embodies a crank operated, rotatable shaft for turning bevel gear sets, one on each side of the carrier, to let out a pair of tubular supports with respect to respective telescoped, threaded shafts. Such mechanism has certain disadvantages, the main one of which is that independent adjustment of the two supports cannot be effected conveniently to take sag out of one side of the carrier to properly level the same. Also, such structure is complex and too costly.

The main object of this invention is to improve the adjusting means for raising and lowering these carriers.

Another object is to provide such an adjusting means whereby both tubular carrier supports may be easily operated upon together, or independently, as desired.

Still another object is to simplify the construction and cheapen the cost of these carrier adjustments.

Other objects will later appear.

Briefly, these objects may be attained by the structure illustrated in the drawing, wherein appears a carrier operatively supported in relation to a thresher self-feeder by means of a pair of spaced tubular supports, each of which includes a telescopically arranged, threaded shaft or rod. Each tubular support has rockably mounted thereon a nut, which has threaded engagement with the adjacent threaded shaft part. These nuts are peripherally pocketed to form a ratchet rim that is engaged by a dog or pawl operable by a hand lever to turn the nut and let out the threaded shaft with respect to the tubular support. A spring pressed toggle serves to hold the dog to duty on the ratchet. By cross connecting both hand levers on each unit, they may be simultaneously actuated upon the manual operation of one of them, and, by disconnecting such cross linkage from the operating levers, either tubular support may be adjusted independently of the other. The spring pressed toggle associated with each manually operable lever serves to control the direction of adjustment; in other words, the nut may turn either clockwise or counter-clockwise, as desired.

In the drawing illustrating a practicable form of the invention,—

Figure 1 is a general perspective view of an assembled carrier and self-feeder, showing the adjustable supports for raising, lowering, or leveling the carrier, said supports carrying the improved adjusting means of the invention;

Figure 2 is a front elevational view of the two interconnected adjusting devices, per se, on an enlarged scale, with one of the devices partly in section;

Figure 3 is a vertical cross sectional view through one of the adjusting devices, taken along the line 3—3 of Figure 2, looking in the direction of the arrows; and, Figure 4 is an elevational view of one of the adjusting devices, as shown in Figure 2, but showing the toggle switch in the opposite position, to reverse the direction of rotation of the adjusting nut.

A self-feeder is shown at 10, to which is hingedly connected at 11 the feeder carrier 12, which includes a conveyer 13 for delivering material loaded there-onto into said feeder 10 in a manner well understood in the threshing art. The feeder carries at each side thereof a trussed, depending frame structure 14 carrying a cross tie rod 15. Similarly, the under part of the carrier 12 includes at each side a trussed, depending frame structure 16.

Pivoted to each frame structure 16 by a pin 17 is a downwardly and rearwardly extending tubular support or pipe 18, each of which at its rear end, as shown in Figure 3, turnably carries a sleeved nut 19 having threaded engagement with a threaded shaft or rod 20, telescoped at its other end and being pivotally connected to the cross rod 15. Thus, each pipe 18 and associated threaded shaft 20 forms a support between the trussed frame structure 16 on the carrier 12 and the trussed frame 14 on the feeder 10. There are two of such supports and they are parallel with each other. Further, each support is extensible or contractible for the purpose of raising or lowering the carrier. The means for performing such adjustment will now be described.

Each sleeve nut 19 includes an integrally formed flange notched at spaced intervals in its periphery to form a ratchet wheel 21. A sleeve 22 is rockably journaled on the sleeve 19, as shown in Figure 3, each sleeve 22 including an upstanding bracket portion 23, to which is appropriately secured a hand lever 24. Each bracket 23 for each adjusting device carries a pin 25, on which is pivotally mounted a bell-shaped member 26 having formed therewith at opposite sides two pawls or dogs 27. Also, pivotally mounted on the pin 25, for movement independent of the member 26, is a switch lever 28 having two oppositely arranged shoulders 29 adapted alternately to engage adjacent points on the top side of the pawl member 26.

Intermediately of its ends, each lever 28 has pivotally connected to it a toggle link 30 encircled by a spring 31, which at one end is connected at 32 to the lever 24 and at its other end abuts a shoulder 33 included in the lever 28. The operating levers 24 each has a hole to receive the bent ends of a cross tie rod 34 for connecting the levers together, as shown in Figure 2, the rod being held in place for quick detachment by means of cotter pins 35. The lever 28 and link 30 in each unit constitute a spring pressed toggle for resiliently locking the switch in over-dead-center positions to hold one or the other of the divergently spread pawls 27 in engagement with the ratchet wheel 21. The link 34 makes it possible to operate both adjusting devices together and simultaneously when one of the levers 24 is manually manipulated. The use and operation of the improved adjusting device will now be described.

Both toggle switch levers 28 will first be flipped to the right hand position shown in Figure 2, the spring pressed toggle link 30 of each holding the right hand pawl 27 of each device in yielding position in a notch in the associated ratchet wheel 21, as will be obvious. The attendant now grasps one of the hand levers 24 and rocks it back and forth about the sleeve 19, causing each stroke to the right, as seen in Figure 2, to turn the associated ratchet wheel 21 one step in a clockwise direction, as indicated by the arrows. Thus, the nut 19 turns to thread the shaft 20 in a direction out of the pipe support 18. Therefore, the support 18, 20 elongates and the carrier platform 12 is raised. As both levers 24 are interconnected by the link 34, both supports 18, 20 are simultaneously adjusted in the manner described. In a step by step manner caused by rocking one lever 24 back and forth, the right hand pawls 27 of both devices serve to turn the ratchet wheel 21 and associated nut sleeve.

If it is desired to lower the carrier platform 12, the switch levers 28 are flipped to the left, as seen in Figure 2, causing the left hand pawls 27 to be operatively associated with the ratchet wheels 21. Rocking movement of the levers 24 will now turn the ratchet wheels 21 counterclockwise, as viewed in Figure 4, to shorten the telescopic supports 18, 20 to lower the carrier.

By oppositely disposing the toggle switch levers 28, the two supports 18 can be simultaneously adjusted in opposite directions to warp or level the carrier to a level position. Or, conversely, by disconnecting the tie rod 34, each support 18 may be adjusted independently of the other.

From this disclosure, it can now be seen that an improved adjusting means for the purpose mentioned has been provided, which attains all of the desirable objects heretofore recited.

It is the intention to cover herein all changes and modifications of the particular embodiment shown and described which do not in material respects constitute departures from the spirit and scope of the invention as claimed.

What is claimed is:

1. An adjusting mechanism for a feeder carrier hingedly associated with the feeder of a thresher, said mechanism comprising a pair of extensible and contractible supports connected between the carrier and feeder, and interconnected rockable means carried by the supports for extending them simultaneously together, or for contracting them simultaneously together, or for extending one and contracting the other simultaneously.

2. An adjusting mechanism for a feeder carrier hingedly associated with the feeder of a thresher, said mechanism comprising a pair of spaced supports, each of which comprises a pipe and threaded rod extending into the pipe with a nut on each rod including a sleeve into which the adjacent pipe is loosely fitted, and interconnected rockable means carried by the nuts for extending the supports simultaneously together, or for contracting them simultaneously together, or for extending one support and contracting the other simultaneously.

ARNT W. WESSMAN.